United States Patent [19]
Obata et al.

[11] Patent Number: 6,002,783
[45] Date of Patent: Dec. 14, 1999

[54] OBJECT CHECKING SYSTEM CAPABLE OF CHECKING OBJECT IRRESPECTIVE OF CHECKING ALGORITHMS FOR REFERENCE DATA

[75] Inventors: Kenzo Obata, Okazaki; Ryosuke Tachi, Obu, both of Japan

[73] Assignees: Denso Corporation, Kariya; Cadix Inc., Tokyo, both of Japan

[21] Appl. No.: 08/998,277

[22] Filed: Dec. 24, 1997

[30] Foreign Application Priority Data

Dec. 26, 1996 [JP] Japan ................................. 8-348497

[51] Int. Cl.$^6$ ........................................ G06K 9/00
[52] U.S. Cl. ...................... 382/119; 382/117; 382/124; 340/825.34
[58] Field of Search ................................. 382/115, 116, 382/119–127; 705/18, 44; 356/71; 340/825.34; 902/5, 6, 26; 178/19.01–19.07; 235/382

[56] References Cited

U.S. PATENT DOCUMENTS

| 4,582,985 | 4/1986 | Lofberg | 235/380 |
|---|---|---|---|
| 4,876,725 | 10/1989 | Tomko | 382/4 |
| 5,144,680 | 9/1992 | Kobayashi et al. | 382/124 |
| 5,150,420 | 9/1992 | Haraguchi | 382/119 |
| 5,259,025 | 11/1993 | Monroe et al. | 380/23 |
| 5,434,928 | 7/1995 | Wagner et al. | 382/187 |
| 5,448,659 | 9/1995 | Tsutsui et al. | 385/14 |
| 5,509,083 | 4/1996 | Abtahi et al. | 382/124 |
| 5,559,895 | 9/1996 | Lee et al. | 382/119 |
| 5,623,552 | 4/1997 | Lane | 382/124 |
| 5,780,778 | 7/1998 | Schwartz et al. | 177/25.13 |
| 5,796,857 | 8/1998 | Hara | 382/124 |
| 5,815,252 | 9/1998 | Price-Francis | 356/71 |
| 5,844,218 | 12/1998 | Kawan et al. | 235/380 |
| 5,864,296 | 1/1999 | Upton | 340/825.3 |

FOREIGN PATENT DOCUMENTS 2-165290  6/1990  Japan .

Primary Examiner—Leo H. Boudreau
Assistant Examiner—Brian P. Werner
Attorney, Agent, or Firm—Pillsbury Madison & Sutro, LLP

[57] ABSTRACT

An object checking system, particularly a signature checking system, verifies each card carrier by checking a signature entered from a tablet provided for a signature checking terminal device with a reference data stored in an IC card carried by the card carrier. The card is provided with a signature checker used to check the signature according to the checking algorithm corresponding to the reference data. The terminal device sends the hand-written signature to the card and receives the check result from the signature checker. Thus, the terminal device can verify the card carrier regardless of the type of the reference data stored in the card. In addition, only the signature checking program may be stored in the card, so that the terminal device reads the checking program to check the target signature or many signature checking programs may be stored in the terminal device in advance.

6 Claims, 8 Drawing Sheets

OBJECT CHECKING SYSTEM CAPABLE OF CHECKING OBJECT IRRESPECTIVE OF CHECKING ALGORITHMS FOR REFERENCE DATA

CROSS REFERENCE TO RELATED APPLICATION

This application relates to and incorporates herein by reference Japanese Patent Application No. 8-348497 filed on Dec. 26, 1996.

BACKGROUND OF THE INVENTION

1. Field of the Invention

The present invention relates to object checking systems, particularly to a signature checking system, for instance, for certifying each card carrier by checking the hand-written signature entered to a signature checking terminal device with the reference data of the card carrier stored in a potable information memory.

2. Description of Related Art

There have been various object identification systems such as an image checking system using images of fingerprints, a voice checking system using voices such as voiceprints. Among them, a signature checking system using hand-written signatures of card carriers is considered useful because of its simple hardware structure, low manufacturing cost and less handling difficulty.

Such signature checking systems are used in various fields. For example, the signature checking system used for transactions (settlements) of credit cards etc. comprises, as shown in FIG. 10, a portable card type information memory 90 such as a credit card storing card-specific information including the card number, the card carrier's signature data used as the signature checking reference data, and the like; a signature checking terminal device 80 for identifying the carrier of the information memory 90 by checking the hand-written signature with the reference data stored in the information memory 90; and an external device (not illustrated) such as a host computer of a credit company or bank that settles the account according to the signature check result from the signature checking terminal device 80.

The signature checking terminal device 80 which is the core part of such a signature checking system is provided with e.g., an input panel 84 formed like a flat plate as shown in FIG. 10 so that the card carrier can sign on a slip or form 82 (receipt) placed on the panel 84. In the central part of the input panel 84 is built a tablet 86 used to read the signature written on the form 82. In addition, a clip 88 is attached to the top end of the input panel 84 and used to hold the form 82 tightly on the panel 84. The signature checking terminal device 80 is also formed so that the information memory 90 can be removed freely.

More specifically, as shown in FIG. 11, the signature checking terminal device 80 includes an information reader 92 for reading various data from the information memory 90; a signature checker 94 for checking the signature entered from the tablet 86 with the reference data read by the information reader 92 from the portable information memory 90; and a transaction determining unit 96 used to determine whether or not the card carrier who signed on the form is the right carrier of the information memory 90 and output the determination result to the external host computer, etc. The signature checker 94 and the settlement determining unit 96 are materialized usually by a microcomputer respectively.

In the prior art signature checking terminal device 80 formed such way, when the information memory 90 is loaded, the information reader 92 reads the signature from the information memory 90 and enters the data to the signature checker 94. When a signature is written on the form 82 put on the input panel 84 of the tablet 86 using a pen 83 that can sense and write signatures, the tablet 86 converts the position, writing pressure, and other data of the pen tip to coordinate data and writing pressure data. Those converted data are then entered into the signature checker 94.

The signature checker 94 then checks the signature with the reference data using a pattern matching method, for example, and the result is output to the transactions determining unit 96. In this case, how much both data items match can be represented by a value of how much the written signature is analogous to the reference data. More specifically, a space distance between the reference data and the newly entered data corresponding to a certain point of the reference value is measured, and the sum is evaluated as an evaluation function. The greater the space distance value is, the more the signature is determined nonanalogous from the registered signature. The smaller the value is, the more the signature is determined matching with the reference data. The signature checker 94 outputs the degree of matching to the settlement determining unit 96 as a value divided within 0.0 to 1.0.

The settlement determining unit 96 determines entered data (determination value) to be true when the value is 0.7 or over and to be false when the value is 0.3 or under. When the value is between 0.3 and 0.7, the signature input is requested again. If the signature is not entered again at this time, the signature check is determined to be canceled and the check itself is invalidated. The result (true or false) is then output to an external device such as the host computer. According to this output, the host computer or another settlement device executes necessary processing of transactions.

In this conventional signature checking system, however, since the information memory 90 and the signature checking terminal device 80 are manufactured according to a specific checking method (checking algorithm), those devices can correspond only to systems matching with the checking method of those devices.

That is, in the case of the signature checking system that checks each signature to certify the card carrier according to the reference data stored in the memory card, the system should preferably be able to use a plurality of types of information memories, each of which stores reference data provided by a different checking algorithm, in the same signature checking terminal device. However, in the conventional system, the information memory can be used only for specific signature checking terminal devices corresponding to the specific algorithm. Consequently, the system has such problems as a limited range of use and inconvenient incompatibility among terminal devices.

SUMMARY OF THE INVENTION

It is an object of the present invention to provide an improved object checking system capable of checking an object irrespective of checking algorithms for reference data of the object.

It is another object of the present invention to provide a signature checking system that can certify each card carrier using a plurality of types of information memories, each of which stores reference data provided by various signature checking algorithms different from other, in one signature checking terminal device.

According to the present invention, when applied to a signature checking system, a portable information memory stores reference data provided from the hand-written signature of a card carrier according to a specified signature checking algorithm. In addition, the system is provided with a signature checker used to check the signature with the reference data according to the signature checking algorithm corresponding to the reference data. In a signature checking terminal device, when a signature is entered to an input unit, an information I/O unit outputs the signature to the information memory, so that a signature checker provided in the information memory checks the signature with the reference data and reads the check result from the checker. The check result is then output to a corresponding external device.

Alternatively, according to the present invention, when applied to a signature checking system, a portable information memory is used to store reference data provided from the hand-written signature of a card carrier according to a specified signature checking algorithm and a signature checking program used to check the signature with the reference data. In the signature checking terminal device, a signature checker reads both the reference data and the signature checking program from the information memory to check the signature entered from the input unit with the reference data according to the read signature checking program and outputs the result to a corresponding external device.

Further, alternatively, according to the present invention, when applied to a signature checking system, a portable information memory is used to store ID data to indicate the type of a signature checking algorithm corresponding to the reference data, in addition to the reference data provided from the hand-written signature of a card carrier according to a specified signature checking algorithm. A signature checking terminal device stores a plurality of signature checking programs in advance, so that signature and the reference data can be checked according to a corresponding signature checking algorithm which differs from other. When the signature entered from an input unit is checked, a signature checking program selector of the signature checking terminal device reads the ID data from the information memory and selects the signature checking program corresponding to the ID data from among a plurality of programs stored in the program memory, then checks the signature entered from the input unit with the reference data stored in the information memory according to the signature checking program selected by the program selector.

Preferably, the information memory should store reference data to which compression information compressed with a specified data compressing method and indicating the data compressing method type is added, and the signature checker is provided with a plurality of expanders corresponding to a plurality of compressing methods and an identifying unit used to identify the compression method from the compression information added to the reference data, so that the reference data is restored to its original one using an expansion unit corresponding to the compression method identified by the identifying unit before a signature is checked with the reference data.

BRIEF DESCRIPTION OF THE DRAWINGS

Other objects, features and advantages of the present invention will become more apparent from the following detailed description when read with reference to the accompanying drawings. In the drawings.

DETAILED DESCRIPTION OF THE PREFERRED EMBODIMENTS

The present invention will be described in detail with reference to various embodiments of an object checking system specifically applied to check hand-written signatures.

(First Embodiment)

Figure 1:
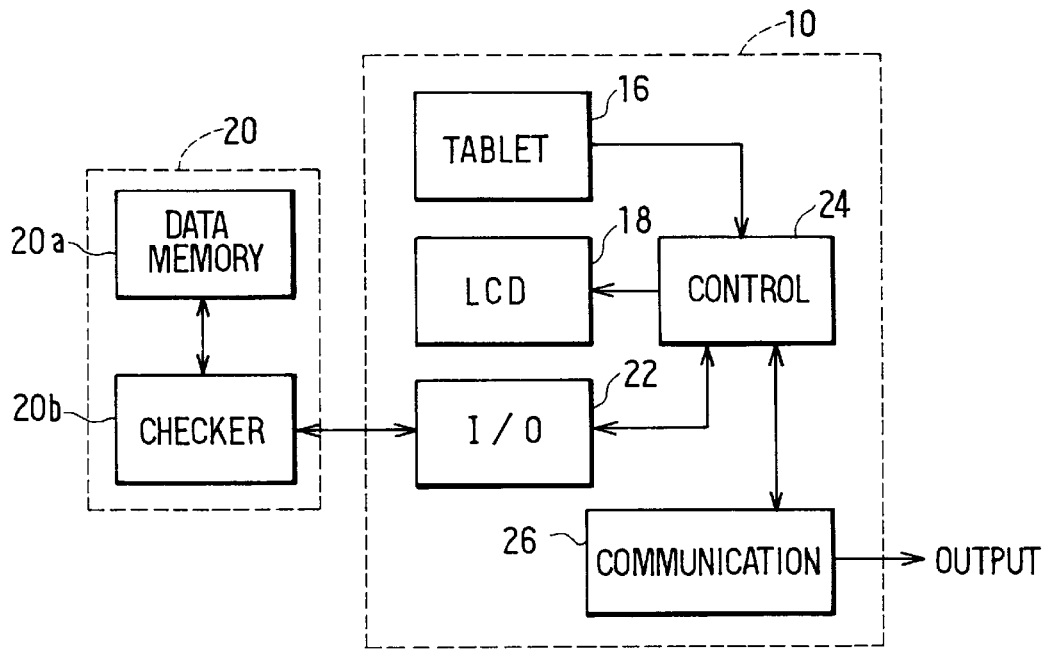
FIG. 1 is a block diagram showing a signature checking system as object checking system having an IC card and a signature checking terminal device according to the first embodiment of the present invention.
Figure 2:
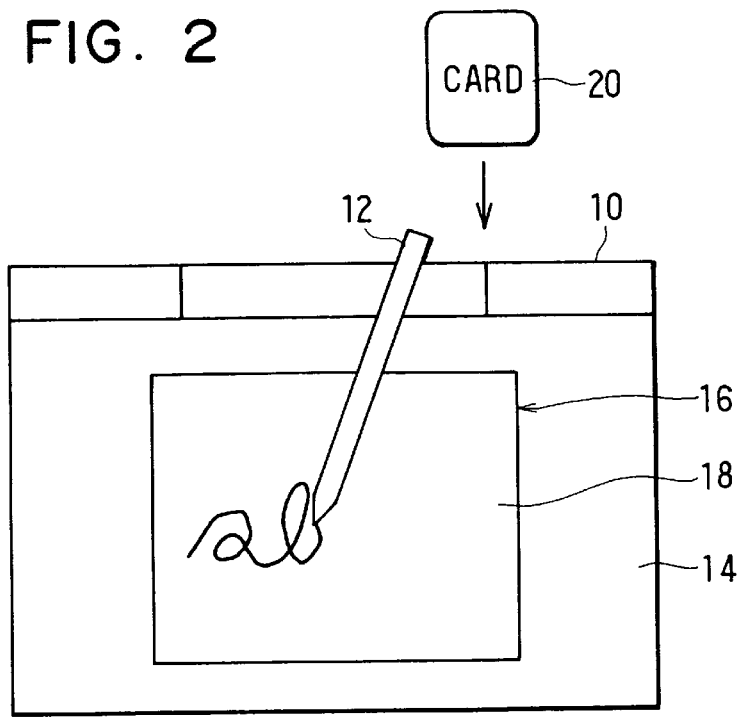
FIG. 2 is a schematic view showing the signature checking terminal device used in the first embodiment.

In FIGS. 1 and 2, a signature checking system includes a signature checking terminal device 10 and an IC card 20 used as an information storage memory unit. The signature checking terminal device 10 includes a thin LCD (liquid crystal display) 18 formed like a sheet on the surface of a tablet 16 built on the signature input panel 14. When a signature is written on the panel 14, the signature is traced and displayed on the LCD 18. The signature checking terminal device 10 in this embodiment does not have any clip used to hold a form. A signature-writing pen 12 of the device 10 does not have a pen tip used to fill a form.

It is known well to use, as the tablet 16, a pressure-sensitive type which detects the position and writing pressure applied externally, a magnetic-coupling type which radiates electromagnetic waves from the surface to resonate the resonant circuit built in the pen and detects the resonant point to detect the position of the pen tip, or a combination of those types. Though any of those types may be used for this signature checking terminal device 10, this embodiment uses the pen 12 in correspondence with the type of this tablet 16.

The signature checking terminal device 10 in this embodiment is formed so that the IC card 20 can be loaded and unloaded freely. As shown in FIG. 1, in addition to the tablet 16 and the LCD 18, inside the terminal device 10 are provided an information I/O unit 22 for sending/receiving data to/from the IC card 20; a communication unit 26 for transmitting signature check result and other data to an external device; and a control unit 24 comprising a microcomputer connected to the information I/O unit 22 and the communication unit 26 respectively.

The IC card 20 comprises a signature data memory 20a for storing the data of the card carrier's hand-written signature coded according to a specified checking algorithm as the reference data and a signature checker 20b used to check the signature using the reference data stored in the memory 20a. The signature memory 20a comprises a nonvolatile memory. In addition to the signature data, the memory is for storing data to identify the card carrier such as ID number, card validity date, card carrier ID number, card carrier name. The signature checker 20b comprises a CPU that can send/receive data to/from the control unit 24 of the signature checking terminal device 10 via the information I/O unit 22.

Figure 3:
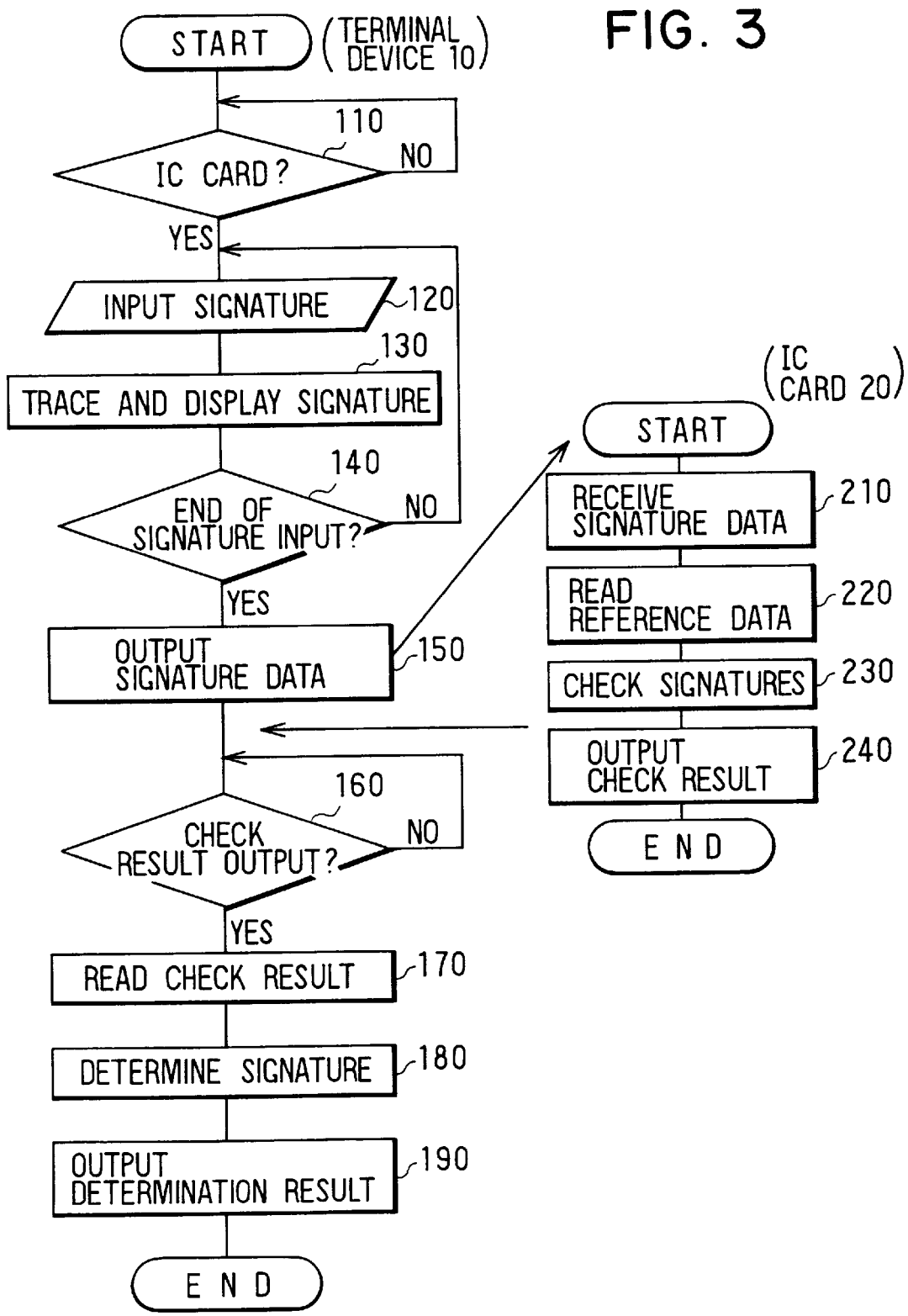
FIG. 3 is a flow chart showing processing of the signature checking system in the first embodiment.

The signature checking system including the terminal device 10 and the IC card 20 is programmed to operate as shown in the flow chart of in FIG. 3.

The signature checking terminal device 10 operates according to the control program executed by the control unit 24. In S110 (S means a computer processing step), it is determined whether the IC card 20 is loaded or not (YES/NO). If determined NO, the system waits until the IC card 20 is loaded. When determined YES, control goes to S120. When the card carrier signs his/her name on the tablet 16 in S120, the signature is processed and entered.

This signature input processing is executed repeatedly in the specified sampling cycle until the signature input is determined ended in S140. When this signature input processing is executed, the signature is traced and displayed on the LCD 18 in S130 according to the input signature (pen tip position coordinate data). In S140, for example, after a signature input is started on the tablet 16, it is determined whether or not (YES or NO) the signature input is ended. The signature end is determined according to whether a signature input stop is continued over the specified time or not.

After this, when determined NO in S140, control goes to S120 again. Then, a series of processing in S120 to S140 are executed. When determined YES in S140, control goes to S150, where the signature (time series data) having been sampled repeatedly in the signature input processing (S120) is output to the IC card 20 via the information I/O unit 22.

The IC card 20 which is in a waiting condition starts to operate when the signature checker 20b receives the signature data from the signature checking terminal device 10. When the IC card 20 is started according to an output of the signature data and the signature output is ended, the signature checking terminal device 10 determines in S160 whether or not (YES/NO) the check result is entered from the IC card 20 and enters the stand-by state to wait for the check result input.

When the IC card 20 operated according to the control program executed by the signature checker 20b is started as above, the IC card 20 receives the signature data from the signature checking terminal device in S210. Then, after receiving the signature data in S210, the IC card 20 reads in S230 the reference data stored in the signature memory 20a in S220 and checks the signature data received in S210 with the reference data according to the check program corresponding to the preset reference data.

When the signature check is ended in S230, control goes to S240, where the check result is output to the signature checking terminal device 10, ending the signature check processing. Then, the IC card 20 executes a processing corresponding to a card data request, etc. from the signature checking terminal device 10 if any.

On the other hand, when the IC card 20 outputs the check result, the signature checking terminal device 10 determines whether the check result output is received in S160. Then, control goes to S170, where the terminal device 10 reads the check result output from the IC card 20. In S180, it is determined whether or not (YES/NO) the signature written on the tablet 16 is the card carrier's according to the check result. The determination result is displayed on the LCD 18 in S190 and output from the communication unit 26 to an external device, ending the signature check processing.

After this, if any action such as a card data request from an external device is detected, the signature checking terminal device 10 executes the specified processing to output the requested card data, for example, by using the IC card 20 again.

As explained above, in the signature checking system in this embodiment, the IC card 20 is provided with a signature checker 20b used to check each signature according to the check algorithm corresponding to the reference data stored in the signature memory 20a. Therefore, when a signature data is entered from the tablet 16, the signature checking terminal device 10 transfers the data to the IC card 20, so that the IC card 20 checks the signature. Then, the terminal device 10 receives the check result from the IC card 20.

Consequently, signature checks are enabled to identify each card carrier when the signature is written on the tablet 16 if the IC card 20 is loaded in the signature checking terminal device 10. In this case, any reference data can be stored in the IC card 20 corresponding to the check algorithm. Since the signature checking terminal device 10 does not need any signature check function, the configuration of the signature checking terminal device 10 can be simplified.

(Second Embodiment)

In the second embodiment, a signature checking terminal device 30 may be constructed in the similar manner as the terminal device 10 of the first embodiment shown in FIG. 2.

Figure 4:
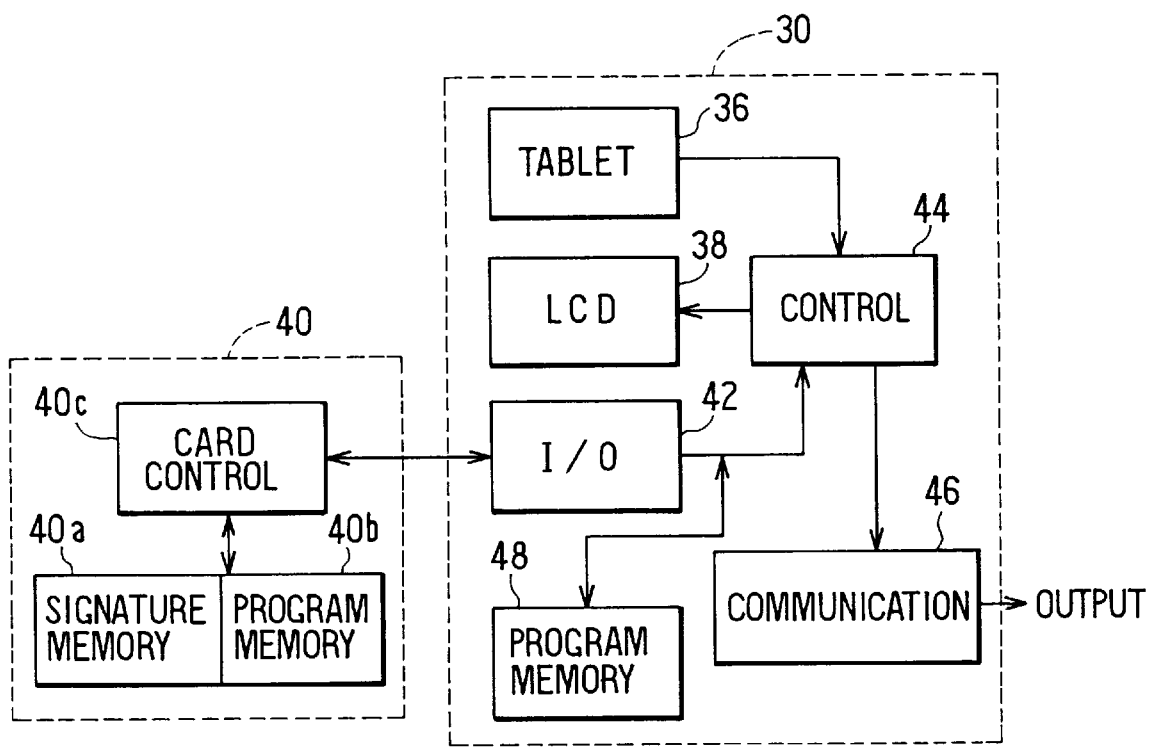
FIG. 4 is a block diagram showing a signature checking system as an object checking system including an IC card and a signature checking terminal device according to the second embodiment of the present invention.

As shown in FIG. 4, an IC card 40 in this embodiment comprises a signature memory 40a used to store the reference data for checking each signature; a program memory 40b used to store a check program for checking each signature according to the reference data; and a card control unit (checker unit) 40c that can read data from the memories 40a and 40b, as well as send/receive data to/from signature checking terminal device 30.

The signature memory 40a and the program memory 40b are formed in the specified nonvolatile memory areas respectively. In addition to a signature data, the signature memory 40a is also used to store card carrier specific data. The card control unit 40c comprises a CPU like the signature checker 20b in the first embodiment.

The signature checking terminal device 30 is constructed by, like the signature checking terminal device 10 in the first embodiment is, a tablet 36, an LCD 38, an information I/O unit 42, a communication unit 46, a control unit 44, and a program memory 48 used to store the signature check program read from the IC card 40 via the information I/O unit 42.

Figure 5:
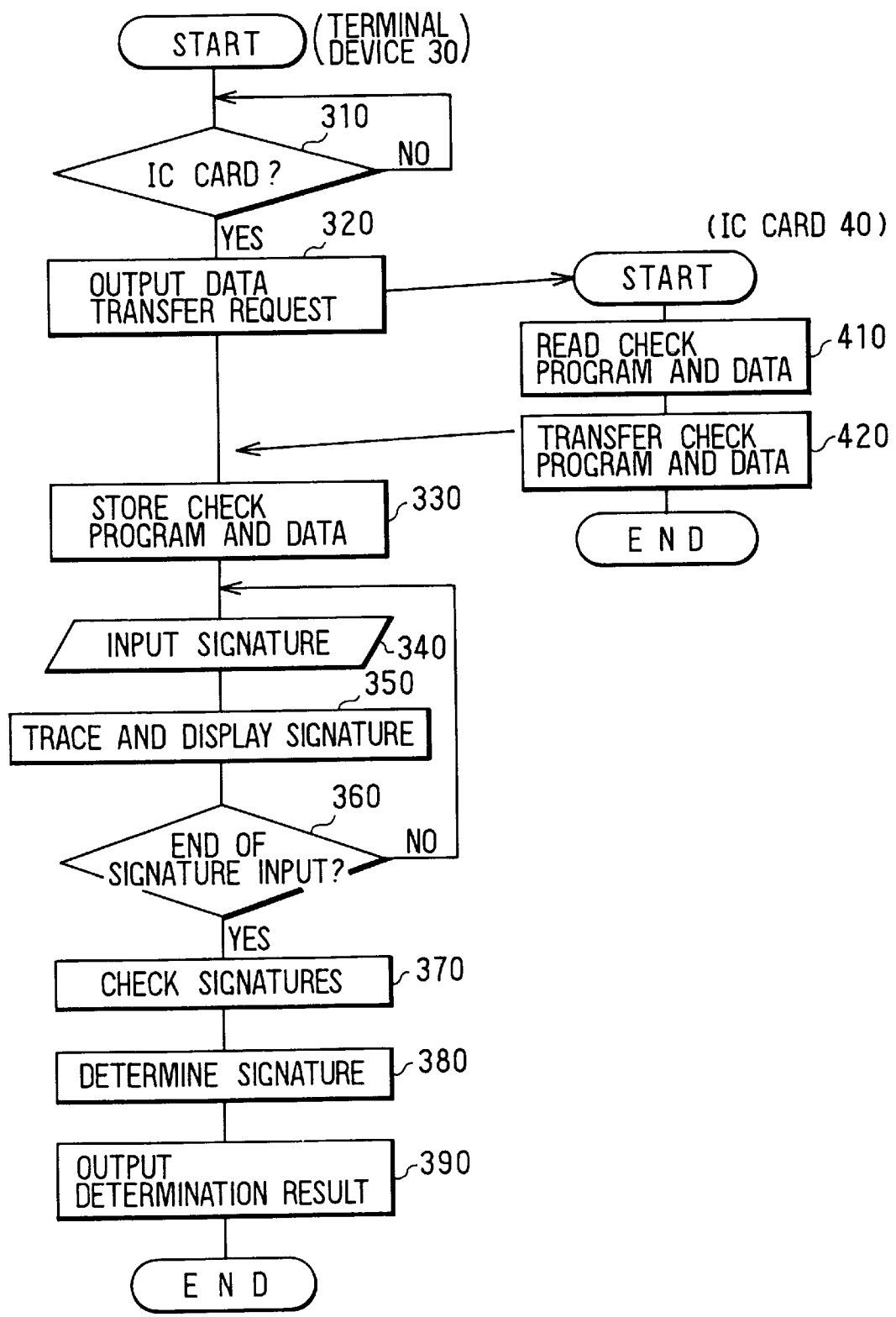
FIG. 5 is a flow chart showing processing of the signature checking system in the second embodiment.

The signature checking system including the terminal device 30 and the IC card 40 is programmed to operate as shown in the flow chart of FIG. 5.

The signature checking terminal device 30 operates according to the control program executed by the control unit 44. In S310, the signature checking terminal device 30 waits until the IC card 40 is loaded by monitoring the result of the determination of whether or not (YES/NO) the IC card 40 is loaded. When determined YES, control goes to S320, where the terminal device 30 outputs a data transfer request to the IC card 40 via the information I/O unit 42.

The IC card 40 operates upon receiving a data transfer request from the signature checking terminal device 30. The terminal device 30, after outputting the data transfer request, enters the stand-by state until the requested data is transferred from the IC card 40.

The IC card 40 reads the signature check reference data and the check program from the signature data memory 40a and the program memory 40b respectively, when working according to the control program executed by the card control unit 40c as explained above. Then, control goes to S420, where the IC card 40 transfers the reference data and the check program to the signature checking terminal device 30. When the transfer ends, the IC card 40 exits the processing to enter the stand-by state again.

Receiving the reference data and the check program from the IC card 40 via the information I/O unit 42, the signature checking terminal device 30 stores the received data and the check program in the program memory 48 in S330.

Then, like the processing in S120 to S140 in the first embodiment, the terminal device 30 reads the signature entered on the tablet 16 (S340) and displays the signature tracing on the LCD (S350) according to the read signature repeatedly in a specified sampling cycle until the signature input is determined ended (YES).

When determined YES in S360, control goes to S370, where the terminal device 30 starts up the signature check program stored in the program memory 48 and checks the signature read in the signature input processing (S340) with the reference data read from the IC card 40.

In S380, the terminal device 30 determines whether or not (YES/NO) the signature written on the tablet 36 is of the carrier's of the IC card 40. The terminal device 30 then displays the determination result on the LCD 38 in S390 and outputs the result from the communication unit 46 to the corresponding external device (computer, etc.), ending the signature check processing.

In the signature checking system in this embodiment, the reference data and the signature check program corresponding to the reference data are stored in the IC card 40 in advance. The signature checking terminal device 30 reads each of the data and program to check the input signature with the reference data according to the read signature check program.

Consequently, according to the signature checking system in this embodiment, if the control unit 44 of the signature checking terminal device 30 can execute the check program stored in the IC card 40, the signature entered from the tablet 36 can be checked with the reference data regardless of the reference data stored in the IC card 40 corresponding to the signature check algorithm.

(Third Embodiment)

Figure 10:
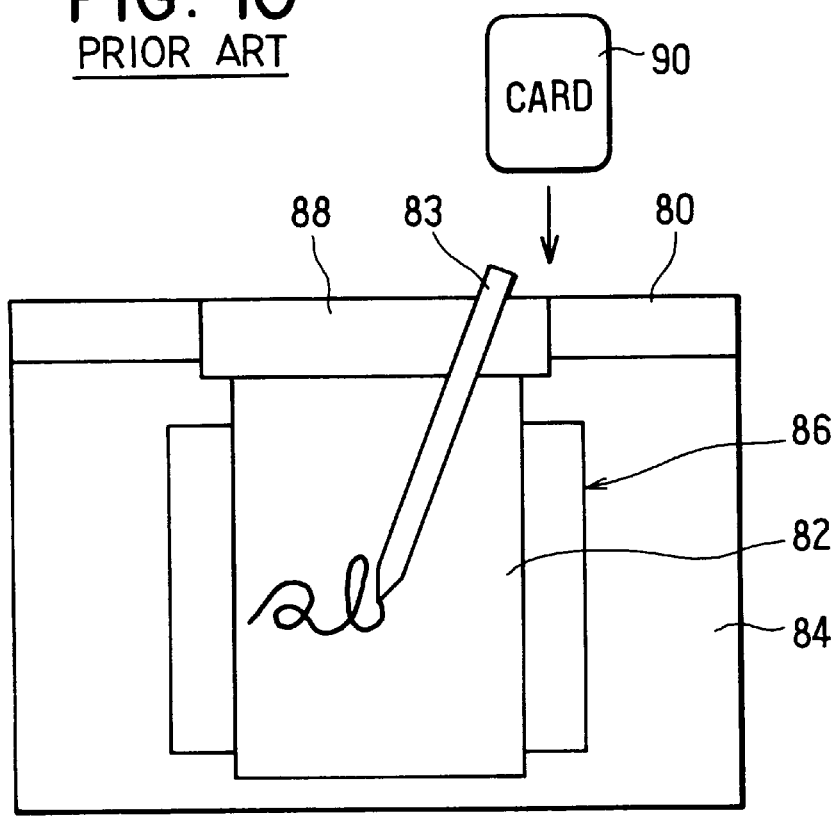
FIG. 10 is a schematic view showing a conventional signature checking system.
Figure 11:
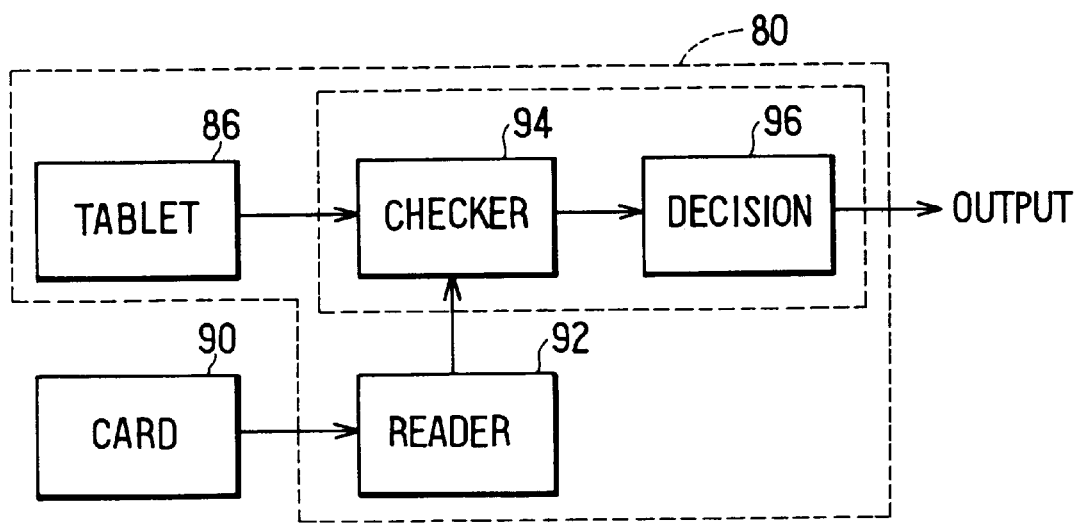
FIG. 11 is a block diagram showing the conventional signature checking system.

In a signature checking system according to this embodiment, a signature checking terminal device 50 is the form mounting type as shown in FIG. 10 and a memory card 60 in use has no signal processing function.

Figure 6:
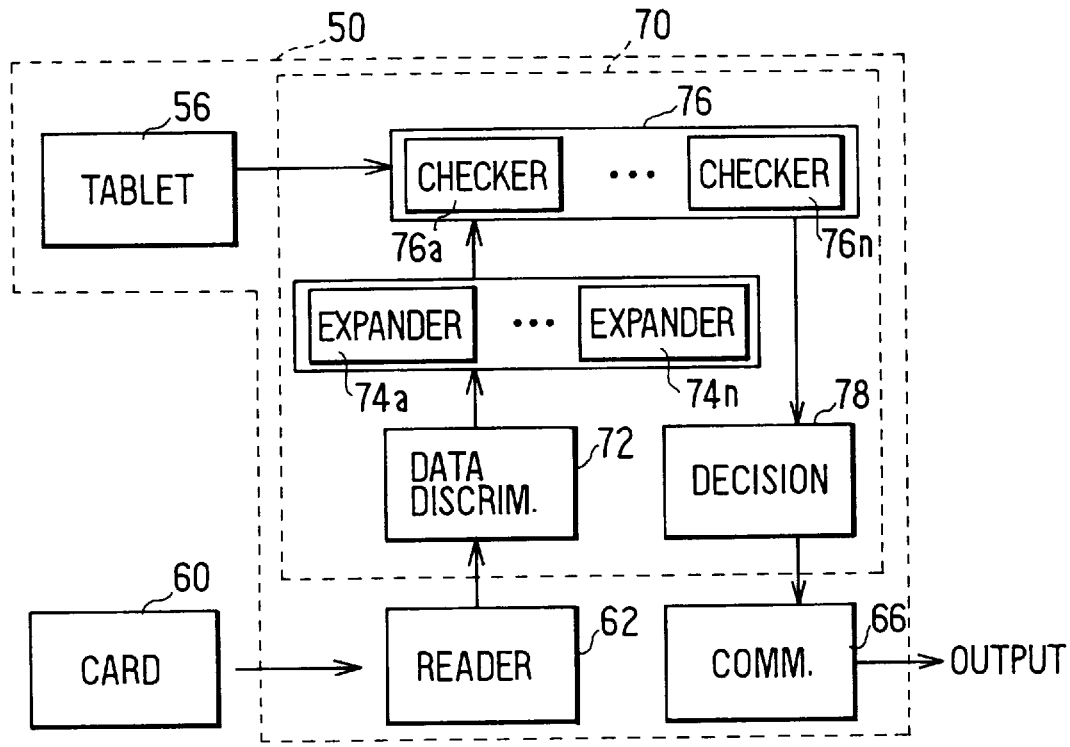
FIG. 6 is a block diagram showing a signature checking system as an object checking system including a signature checking terminal device according to the third embodiment.

As shown in FIG. 6, since the signature checking terminal device 50 is the form mounting type, the terminal device 50 is not provided with a signature display LCD. The terminal device 50 is provided only a tablet 56 as the user interface. In addition, since the terminal device 50 uses a memory card as the information memory, the terminal device 50 is provided with an information reader 62 used instead of the information I/O unit in each of the above embodiments. The data in the memory card 60 which is read via the information reader 62, and the signature entered from the tablet 56 are entered to the control unit 70 to be checked. The check result is output from the control unit 70 to an external device via the communication unit 66.

Figure 7A:
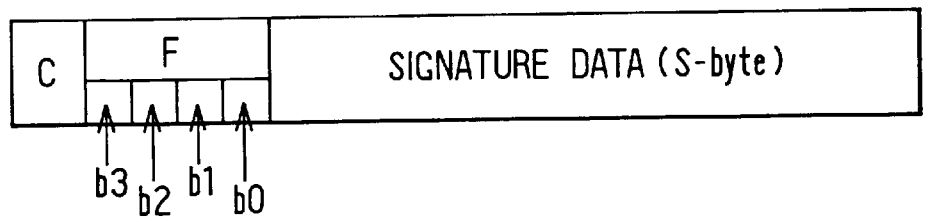
FIG. 7A and FIG. 7B are schematic views of signature reference data stored in a memory card of the signature checking system in the third embodiment.
Figure 7B:
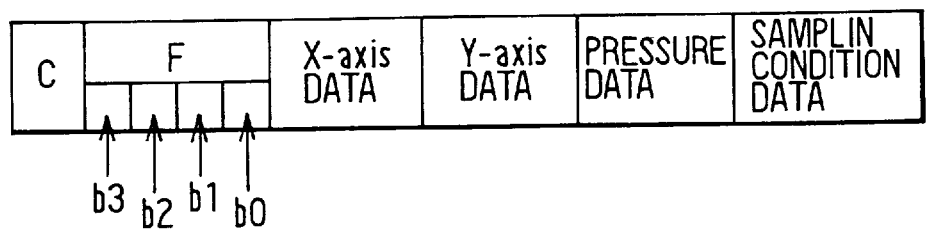
Figure 8A:
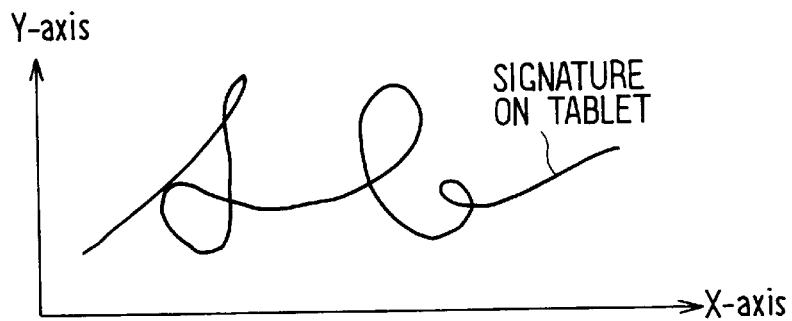
FIGS. 8A to 8D are charts showing signature reference data shown in FIG. 7B.
Figure 8B:
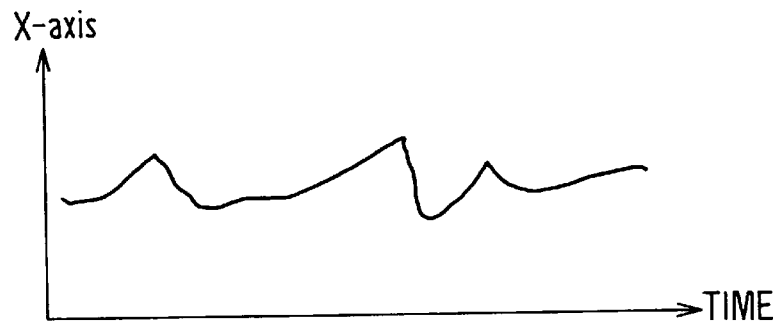
Figure 8C:
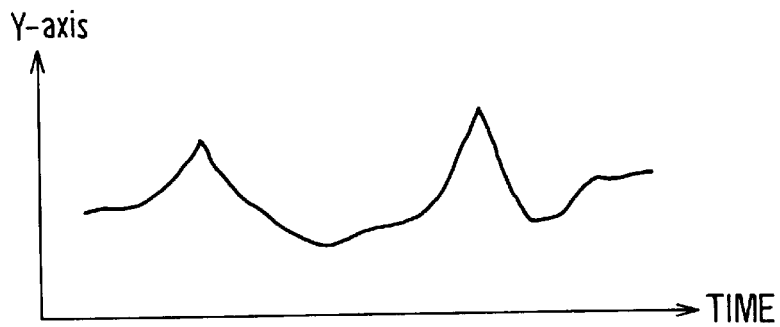
Figure 8D:
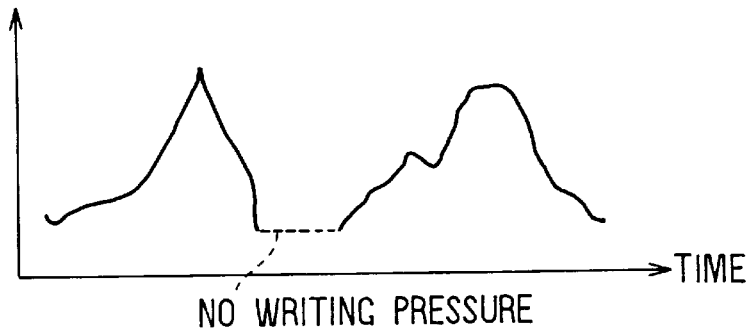

The memory card 60 stores reference data provided from the card carrier's hand-written signature according to a specified signature check algorithm. The reference data is compressed with a specified compression method. As shown in FIGS. 7A and 7B, the reference data is provided with a compressed information flag "C" used to identify the compression method applied to the reference data. The reference data is also provided with a signature check procedure flag "F" used as ID data indicating the check algorithm corresponding to the reference data. The content of each of those flags "C" and "F" is defined as shown in the following Table.

TABLE

| | |
|---|---|
| Flag C: | Code 0 = No compression |
| | Code 1 = A-type compression |
| | Code 2 = B-type compression |
| | Code n = N-type compression |
| Flag F: | Code b0 = a-method |
| | Code b1 = b-method |
| | Code b2 = c-method |
| | Code b3 = d-method |

FIG. 7A indicates the signature data (reference data) provided by converting a signature to S-byte data and FIG. 7B indicates the time-series data shown in FIGS. 8A to 8D, which is obtained from the output signal of the tablet 56. That is, the time-series data means a signature (reference data) in which both X-axis data and Y-axis data obtained by sequential sampling of the coordinate data output from the tablet 56 when a signature is written, the writing pressure data obtained by sequential sampling of the writing pressure output from the tablet 56 when a signature is written, and the data indicating sampling conditions, etc. for those data items are registered sequentially.

As is the IC card in the above embodiments, the memory card 60 stores reference data used for checking the card carrier's signature as described above, as well as the card ID number, card validity date, card carrier ID number, card carrier's name, and other card carrier's specific data.

In order to check the target signature using various types of reference data stored in the memory card 60, a control unit 70 of the signature checking terminal device 50 is provided with a data expander group 74 comprising a plurality of data expanders 74a, 74b, . . . 74n used to restore the initial reference data by expanding the reference data compressed by compression methods that are different from each other; a signature checker group 76 comprising a plurality of signature checkers 76a, 76b, . . . 76n used to check signatures with signature check algorithms that are different from each other; a signature discriminator 72 used to determine whether or not (YES/NO) reference data can be expanded and used to check the signature using the data expander group 74 and the signature checker group 76 from the compression information flag "C" and the checking procedure flag "F" added to the reference data read from the memory card 60 via the information reader 62, so that when data expansion and signature checking are determined possible, the data expander and the signature checker, corresponding to the reference data, in the data expander group 74 and the signature checker group 76 are started up; and a decision block 78 that verifies the card carrier with the check result received from the signature checker group 76 and outputs a verification to the communication unit 66, so that the communication unit 66 sends the result to a corresponding external device.

Each of those functions is executed by a microcomputer forming the control unit 70. When executing the data expander group 74 and the signature checker group 70 using such a microcomputer respectively, data expansion programs corresponding to various compression methods and signature checking programs corresponding to various checking algorithms are needed. To cope with such the processing, the control unit 70 in this embodiment is provided with a memory storing various programs. A data expansion program and a signature checking program necessary for such data expansion and signature checking processing is selected from the memory.

Figure 9:
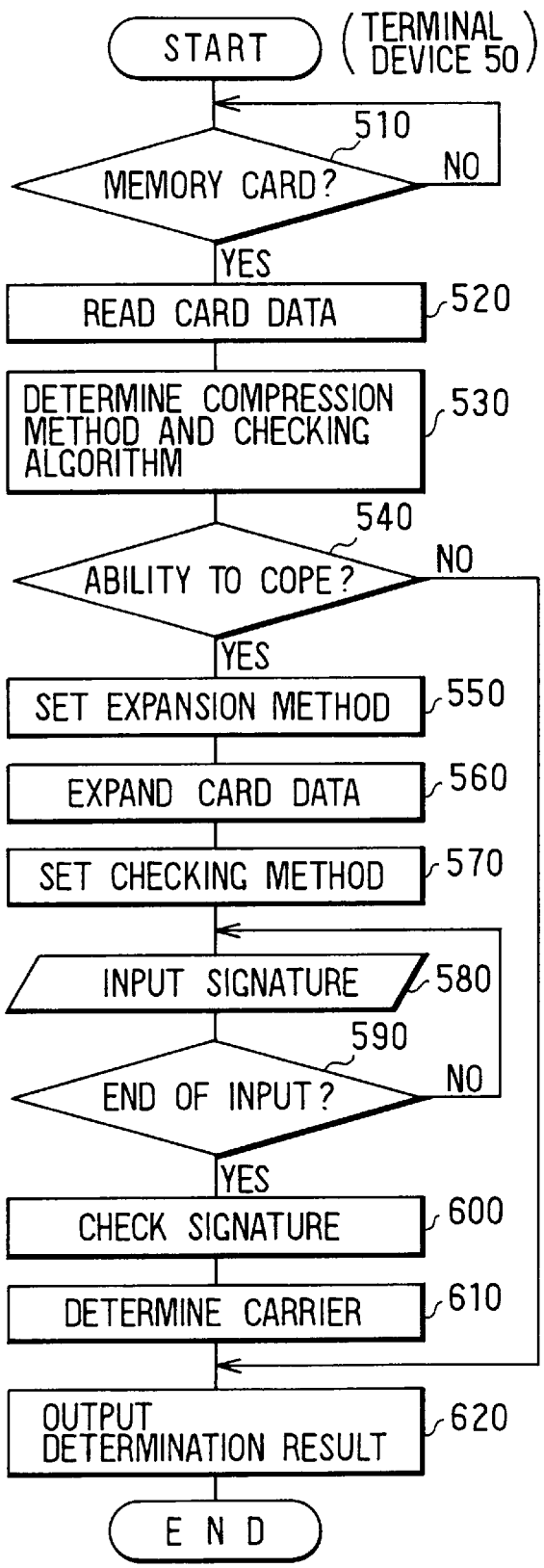
FIG. 9 is a flow chart showing processing of the signature checking system in the third embodiment.

The signature checking system, more specifically the signature checking terminal device 50, is programmed to operate as shown in the flow chart of FIG. 9. This operation is executed by the microcomputer provided in the control unit 70.

The signature checking terminal device 50 waits for the memory card 60 to be loaded by determining in S510 repeatedly whether or not (YES/NO) the memory card 60 is loaded. When determined YES, control goes to S520, where the terminal device 50 reads card data (signature check reference data from the memory card 60, then determines in S530 the compression method of the reference data and the signature checking algorithm corresponding to the reference data from the data flags (the compression information flag "C" and the checking procedure flag "F") added to the read reference data as shown in FIGS. 7A and 7B.

In S540, the terminal device 50 determines whether or not (YES/NO) the system can cope with the reference data read from the memory card 60 from the determination result. When determined NO (when the reference data cannot be expanded or the signature cannot be checked with the reference data), control goes to S620.

When determined YES (the system can cope with the read reference data), control goes to S550. Then, the terminal device 50 sets the expansion method corresponding to the compression method of the reference data according to the compression information flag "C" added to the reference data. That is, the terminal device 50 selects the program corresponding to the compression method of the reference data from among many data expansion programs stored in the memory in advance. When the expansion method is set, the terminal device expands the data read from the memory card 60 according to the set expansion method in S560 to restore the initial reference data.

In S570, the terminal device 50 sets the signature data checking method corresponding to the reference data according to the checking procedure flag "F" added to the reference data. That is, the terminal device 50 selects the program corresponding to the reference data from among many check programs stored in the memory.

When the signature checking method is set, control goes to S580. The terminal device 50 repeats a signature input processing to read the signature entered from the tablet 56 in a specified sampling cycle until the signature input is determined ends in S590. When the signature input is determined ended in S590, control goes to S600 and the terminal device 50 checks the signature read via the tablet 56 with the expanded and restored reference data in S560 according to the set signature data checking method (that is, the check program corresponding to the reference data).

In S610, the terminal device 50 determines in S610 whether or not (YES/NO) the signature written on the tablet is the carrier's one of the memory card 60 and outputs the determination result to a corresponding external device (computer etc.) from the communication unit 66 and ends the signature checking processing. When the reference data read in S540 is determined NO (not correspond to the system) in S620, the NO (mismatching) message is output to the external device in S620.

As explained above, in the signature checking system in this embodiment, the memory card 60 stores not only compressed reference data for signature checking, but also flags "C" and "F" which indicate the compression method and the check algorithm corresponding to the reference data. Then, reading the reference data from this memory card 60, the terminal device 50 identifies the compression method of the reference data and the check algorithm corresponding to the reference data to select the compression method and the checking method corresponding to the compression method from among those registered in advance and uses the selected ones to expand the reference data for checking the signature.

According to this embodiment, the number of types of the memory card 60 can be increased in the signature checking terminal device 50, although many programs for checking signatures and expanding data must be registered in the terminal device 50 in advance.

The above embodiments may be modified in various ways. For example, although signature checking or data expansion programs are stored in the corresponding system, each of those programs may be down-loaded from various networks so that it is modified or added as needed. Consequently, the signature checking system can be used more widely. When the signature checking system is formed, the signature checking procedure can be modified, so that, for example, the checking procedure is used for network services such as information supply, electronic settlement. The network can be accessed by entering a signature in any checking procedure and the network security is improved significantly. The signature checking system of the present invention can improve the network security all the more. In addition, any data other than signature (reference data), for example, checking programs can be compressed by a specified compression method.

Further, the present invention should not be limited to signature checking system but may be applied to check other objects such as fingerprints, eye pupil or the like by storing a reference image of those as reference data and comparing actually provided image.

We claim:

1. An object checking system, comprising:

a portable information memory storing therein reference data provided from a first image of an object according to a specified image checking algorithm in advance; and a checking terminal device having input means for converting a second image of an object to image data and entering said image data, so that said image data entered from said input means is checked with said reference data stored in said information memory, wherein said information memory is provided with checking means for checking said image data with said reference data according to an image checking algorithm corresponding to said reference data, and said image checking terminal device is provided with input/output means for outputting said image data entered from said input means to said information memory so that said image checking means can check said image data, as well as for reading a check result from said image checking means, wherein:

said information memory stores said reference data in compressed form together with data compression information indicative of a type of a specified data compressing method; and said checking means includes a plurality of data expansion means corresponding to said plurality of compressing methods and discriminator means for discrimination said data compressing method from said data compression information added to said reference data, so that said reference data is restored to its original one using one of said data expansion means corresponding to said compressing method discriminated by said discriminator means before said image data is checked with said reference data.

2. The object checking system of claim 1, wherein said image is a signature of a carrier of said portable information memory.

3. An object checking system, comprising:

a portable information memory storing therein reference data provided from a first image of an object according to a specified image checking algorithm in advance; and an image checking terminal device provided with input means for converting a second image of an object to image data and entering said image data, so that said image data entered from said input means is checked with said reference data stored in said information memory, wherein said information memory stores an image checking program to be used to check said image data with said reference data according to said image checking algorithm, and said image checking terminal device is provided with check means for reading said reference data and said checking program from said information memory and for checking said image data entered from said input means with said reference data according to said checking program, wherein:

said information memory stores said reference data in compressed form together with data compression information indicative of a type of a specified data compressing method; and said checking means includes a plurality of data expansion means corresponding to said plurality of compressing methods and discriminator means for discrimination said data compressing method from said data compression information added to said reference data, so that said reference data is restored to its original one using one of said data expansion means corresponding to said compressing method discriminated by said discriminator means before said image data is checked with said reference data.

4. The object checking system of claim 3, wherein said image is a signature of a carrier of said portable information memory.

5. An object checking system, comprising:

a portable information memory storing reference data provided from a first image of an object according to a specified image checking algorithm in advance; and an image checking terminal device provided with input means for converting a second image of object to image data and for entering said image data, so that said image data entered from said input means is checked with said reference data stored in said information memory, wherein said information memory stores ID data indicating a type of a checking algorithm by which said reference data is provided in advance, and said image checking terminal device includes checking program means for storing a plurality of image checking programs each of which is for checking said image data entered from said input means with said reference data stored in said information memory according to different checking algorithms, selector means for reading said ID data from said information memory to select said checking program corresponding to said ID data from among said plurality of checking programs stored in said checking program means, and check means for checking said image data entered from said input means with said reference data stored in said information memory corresponding to said checking program selected by said program selector means, wherein:

said information memory stores said reference data in compressed form together with data compression information indicative of a type of a specified data compressing method; and said checking means includes a plurality of data expansion means corresponding to said plurality of compressing methods and discriminator means for discrimination said data compressing method from said data compression information added to said reference data, so that said reference data is restored to its original one using one of said data expansion means corresponding to said compressing method discriminated by said discriminator means before said image data is checked with said reference data.

6. The object checking system of claim 5, wherein said image is a signature of a carrier of said portable information memory.

* * * * *